United States Patent [19]

Albertin et al.

[11] 4,385,641
[45] May 31, 1983

[54] THREE-PASSAGE VALVE

[75] Inventors: Michel Albertin, Annecy-le-Vieux; Lucien Lavorel, Annecy, both of France

[73] Assignee: Compagnie Industrielle des Telecommunications Cit-Alcatel, Paris, France

[21] Appl. No.: 234,146

[22] Filed: Feb. 13, 1981

[30] Foreign Application Priority Data

Feb. 13, 1980 [FR] France ............................. 80 03177

[51] Int. Cl.³ .......................... F16K 31/52; F16K 1/22
[52] U.S. Cl. .................................. 137/636.1; 137/862; 137/887; 251/251; 251/288
[58] Field of Search .................. 137/636, 636.1, 636.2, 137/636.3, 861, 862, 883, 887, 607; 251/251, 288, 305, 306

[56] References Cited

U.S. PATENT DOCUMENTS

| 891,964 | 6/1908 | Taylor | 137/636.1 |
| 2,633,152 | 3/1953 | Trevaskis | 137/636.1 |
| 3,002,531 | 10/1961 | Katva | 137/607 |
| 3,403,700 | 10/1968 | Meynell | 137/636.1 |
| 3,490,495 | 1/1970 | Green | 137/636.1 |

FOREIGN PATENT DOCUMENTS

| 1440777 | 4/1902 | France . |
| 1536322 | 8/1968 | France . |
| 1572490 | 6/1969 | France . |
| 2042130 | 9/1980 | United Kingdom ................ 137/607 |

Primary Examiner—George L. Walton
Attorney, Agent, or Firm—Sughrue, Mion, Zinn, Macpeak and Seas

[57] ABSTRACT

A three-passage valve comprising (1) a body with a main passage (10) and two secondary passages (12,13), each of the secondary passages being fitted with a respective closure member (2,3) and the valve as a whole being provided with a single, common actuator unit (6) to operate the closure members in such a manner that the valve can occupy any one of three positions: a first position in which the main passage is in communication with a first one of the secondary passages while the other secondary passage is closed; a second, or intermediate, position in which both of the secondary passages are closed; and a third position in which said first passage is closed while the main passage is in communication with said other secondary passage. The secondary passages are located on opposite sides of the valve body and have a common axis (14,15) with the closure members of the secondary passages being rotatably mounted on respective axles (20,30) which are parallel to each other and which have respective closure member drive cams (4,5) fast thereto. The actuator unit is rotatably mounted on an axle (60) that is parallel to said closure member axles and which is located in between them, said parallel axles being perpendicular to the common axis of the secondary passages. The actuator unit includes a drive plate (7) fitted to rotate about said actuator unit axle and fitted with two drive studs (e.g. 72), each of which co-operates with a slot (40) in the drive cam of a respective one of the closure members. The drive plate is fitted with a central cam (8) which, for each of the secondary passages, has a locking sector and a release sector (e.g. 81 & 83 respectively, see FIG. 1) which co-operate with associated profiles of the drive cams depending on the positions to which they are rotated by the drive stud.

1 Claim, 4 Drawing Figures

THREE-PASSAGE VALVE

The invention relates to a three-passage valve of the type currently used in industry to connect a main passage with one or other of two secondary passages, or else to cut the main passage off from both of the secondary passages.

BACKGROUND OF THE INVENTION

Three-passage valves generally comprise a body with three passages, a valve mechanism and a single control lever which makes it possible to avoid erroneous operation.

However, these valves have disadvantages. When closing a first passage and opening a second, the control lever successively passes from a first position in which the first passage is open, to a middle position in which both passages are closed, and on to a second position in which the second passage is open. Now, during these operations, the various parts of the valve mechanism pass successively in front of each of the passages so that the same zones of the valve mechanism are successively in relation with each of the passages. Therefore, the quality of the sealing between each passage and the others is related to the quality of the sealing of the other passages.

Preferred embodiments of the present invention provide a three-passage valve in which the quality of sealing of any one passage is independent from that of the others.

SUMMARY OF THE INVENTION

The invention provides a three-passage valve comprising a body with a main passage and two secondary passages, each of the secondary passages being fitted with a respective closure member, and the valve as a whole being provided with a single, common actuator unit to operate the closure members in such a manner that the valve can occupy any one of three positions: a first position in which the main passage is in communication with a first one of the secondary passages while the other secondary passage is closed; a second, or intermediate, position in which both of the secondary passages are closed; and a third position in which said first passage is closed while the main passage is in communication with said other secondary passage; wherein the secondary passages are located on opposite sides of the valve body and have a common axis with the closure members of the secondary passages being rotatably mounted on respective axles which are parallel to each other and which have respective closure member drive cams fast thereto, wherein the actuator unit is rotatably mounted on an axle that is parallel to said closure member axles and which is located in between them, said parallel axles being perpendicular to the common axis of the secondary passages, wherein the actuator unit includes a drive plate fitted to rotate about said actuator unit axle and fitted with two drive studs, each of which co-operates with a slot in the drive cam of a respective one of the closure members, and wherein the drive plate is fitted with a central cam which, for each of the secondary passages, has a locking sector and a release sector which co-operate with associated profiles of the drive cams depending on the positions to which they are rotated by the drive stud.

Preferably, for each secondary passage, the locking sector of the drive cam may be circular and the release sector is truncated and the drive cam may have a concave portion for receiving the locking sector of the central cam.

The cam may include stops to lock them in their open position, said stops co-operating with the drive stud used to drive the other drive cam.

Such a valve may be of the quarter-turn type and may control an installation under vacuum.

BRIEF DESCRIPTION OF THE DRAWINGS

A preferred embodiment of the invention is described by way of example with reference to the accompanying drawings, in which.

DESCRIPTION OF PREFERRED EMBODIMENTS

Figure 1:
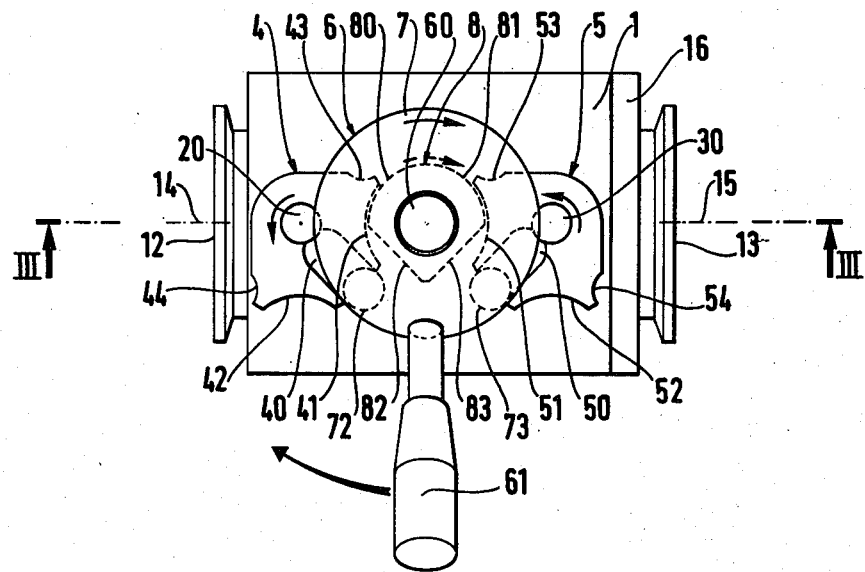
FIG. 1 is a top view of the valve in accordance with the invention in the closed position.
Figure 2:
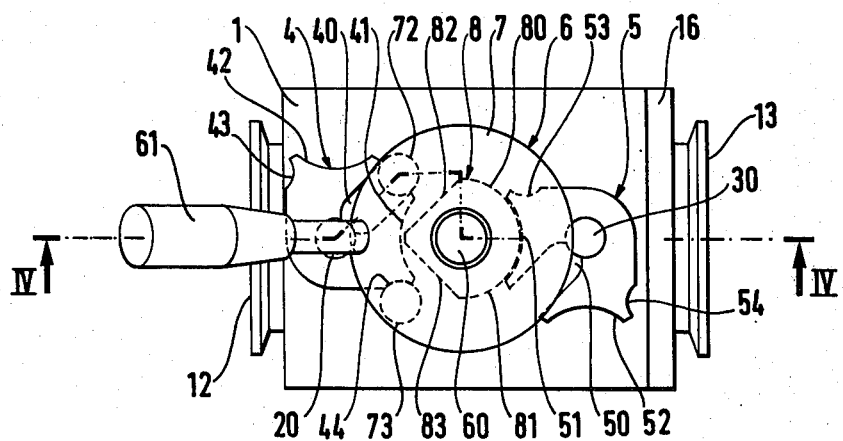
FIG. 2 is a top view of the valve in FIG. 1 with one of the secondary passages open.

The figures show a generally rectangular valve body 1 which has a main passage 10 leading through its bottom face (see FIGS. 3 and 4), two secondary passages 12 and 13 passing through opposite side faces. The secondary passages 12 and 13 have respective axes 14 and 15 which lie in the same plane as the axis 11 of the passage 10, and are perpendicular thereto. All references in this description to directions such as "top", "bottom", "side", "vertical" etc. refer to the valve as shown in the figures, and have no bearing on the orientation which the valve may occupy in use.

The passage 12 is fitted with a closure member in the form of a circular valve disk 2 having a seal ring 21. The valve disk rotates on a vertical axle 20 having a seal ring 22. The passage 13 is fitted with a similar closure member in the form of a circular valve disk 3 having a seal ring 31. The valve disk rotates on an axle 30 having a seal ring 32.

Each of the axles 20 and 30 include a respective drive cam 4, 5 located on the top face of the body 1. The drive cams are designed to co-operate with an actuator unit 6 which includes a control cam 8 located underneath a drive plate 7.

The acutator unit 6 rotates about a vertical axle 60 by a lever 61. The axle 60 is in line with the axis 11 of the main passage 10 and is disposed parallel to and in the same plane as the axes 20 and 30. The underside of the drive plate 7 has two peripherally located drive studs 72 and 73.

In the position shown in FIG. 1, the control cam 8 has, on each side facing one or other of the secondary passages, a quarter-circle sector 80 or 81 constituting a locking sector for the associated drive cam, and a truncated sector (i.e. with a segment removed) 82 or 83 which likewise extends over a quarter-circle and which constitutes a release sector for the associated drive cam.

Each of the drive cams 4 and 5 has a radial slot 40 or 50 which co-operates with a respective one of the drive studs 72 and 73. The profiles of the cams 4 and 5 have identical concave portions 41,51 and 42, 52 on either side of the slots 40,50. The radius of curvature of each concave portion is just slightly larger than that of the circular locking sectors 80 and 81 of the control cam 8. Beyond the ends of concave portions, rounded portions have been cut away at 43 and 53 and at 44 and 54 to form stops.

Figure 3:
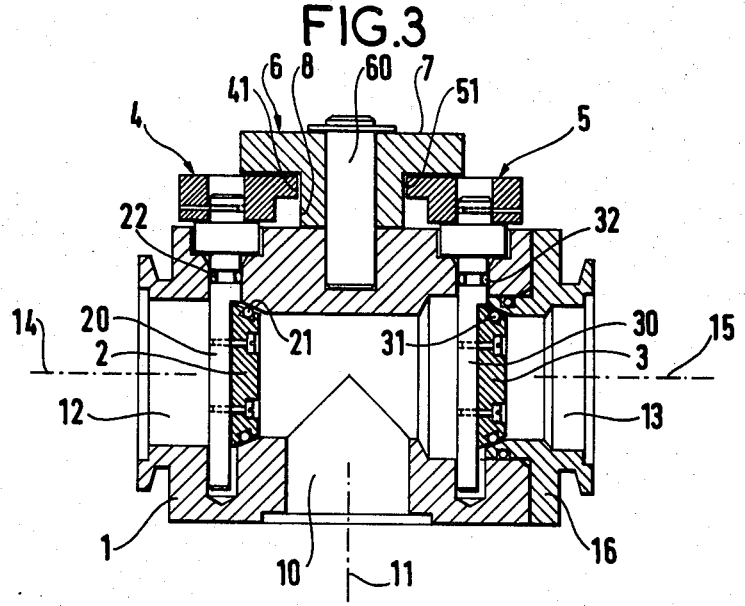
FIG. 3 is a cross-section along III—III of the valve in FIG. 1.

The valve operates as follows. When the valve discs 2 and 3 of the secondary passages 12 and 13 are simultaneously closed as illustrated in FIGS. 1 and 3, the drive studs 72 and 73 are disposed at the openings of the slots 40 and 50 so as to prevent valves 2 and 3 from moving. Both the angle formed between the axis of each of the slots 40 and 50 and the axis of the secondary passages, and the angular position of the studs 72 and 73 from the axis of the secondary passages is 45 degrees.

Figure 4:
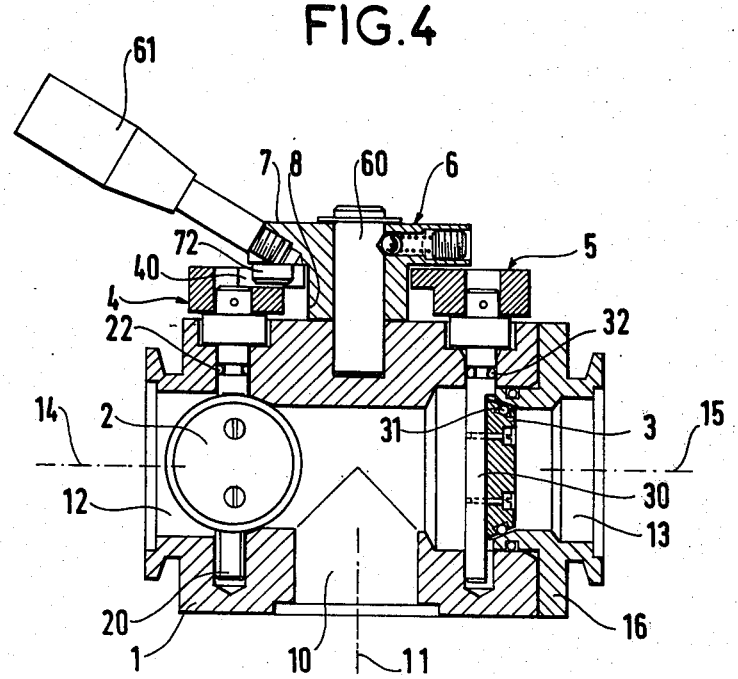
FIG. 4 is a cross-section along IV—IV of the valve in FIG. 2.

When lever 61 is rotated clockwise through a quarter turn, the drive stud 72 engages in the slots 40 to make the cam 4 rotate through a quarter turn anti-clockwise. The profiles of the cams 8 and 4 make this movement possible since at all times, the sum of their radii lying along the line between the axles 60 and 20 remains less than the distance between these axles. Simultaneously, the stud 73 moves away from the opening of the groove 50. However, the profiles of the cams 5 and 8 are such that the valve disk 3 is prevented from rotating, since the sum of the radii lying along the line between the axles 60 and 30 tends to exceed the distance between these axles, thereby locking the valve disk 3 in the closed position. After the pins 60 and 20 have rotated through a quarter turn, the valve disk 2 is fully open and the stud 73 is pressed against the stop 44 of the cam 4. FIGS. 3 and 4 show this position.

To close the valve disk 2 of the passage 12, the lever need only be rotated through a quarter turn in the opposite direction to set the valve with both its disks simultaneously in the closed position. Rotating the lever through a quarter turn in the opposite direction opens the valve disk 3 of the passage 13 while the valve disk 2 of the passage 12 remains simultaneously closed.

It will be observed that for easy access to the inner surface of the valve disk 3, the beginning of the secondary passage 13 is fixed onto the valve body 1 by a detachable end plate 16 fixed to the valve body by screws, not shown.

The advantages of the invention are as follows.

Each passage is closed or opened by its own valve disk.

Closing or opening of each passage is complete before the other passage is opened or closed and vice-versa.

No surface of the assembly comes in front of either of the passages before they are completely closed.

One passage is completely sealed independently from and without affecting the other.

All these qualities are particularly advantageous in low-pressure situations and more particularly in surface degassing under a vacuum, for reasons which follow.

It is important to control each passage by means of its own valve disk so that each passage always sees its own closure member.

It is important to close one passage completely before the other begins to open since this prevents any leakage of pressure and any contamination of the degassing process.

It is important that no other related surfaces come in front of the passages during a closing movement since this prevents a chamber from being degassed to other pressure levels.

It is important to separate the sealing functions since this allows operation of any one passage to be performed without affecting the other.

We claim:

1. A three-passage valve comprising: a body with a main passage and two secondary passages, each of said secondary passages being fitted with a respective closure member, said valve as a whole being provided with a single, common actuator unit to operate the closure member in such a manner that the valve can occupy any one of three positions: a first position in which the main passage is in communication with a first one of the secondary passages while the other secondary passage is closed; a second, or intermediate position in which both of the secondary passages are closed; and a third position in which said first passage is closed while the main passage is in communication with said other secondary passage; said secondary passages being located on opposite sides of the valve body and having a common axis with said closure members of said secondary passages being rotatably mounted on respective axles which are parallel to each other, respective closure member drive cams being fixed to said closure members, the actuator unit being rotatably mounted on an axle that is parallel to said closure member axles and which is located in between them, said parallel axles being perpendicular to the common axis of the secondary passages, the actuator unit including a drive plate fitted to rotate about said actuator unit axle and fitted with two drive studs, each stud being engageable with a slot in the drive cam of a respective one of the closure members, and the drive plate being fitted with a central cam which, for each of the secondary passages, has a locking sector and a release sector which co-operate with associated profiles of the drive cams depending on the positions to which they are rotated by the drive stud, and wherein the drive cams include stops to lock them in their open position, said stops engaging the drive stud used to drive the other drive cam.

* * * * *